March 20, 1945. B. B. KAHN 2,372,086
STOVE
Filed Feb. 18, 1941
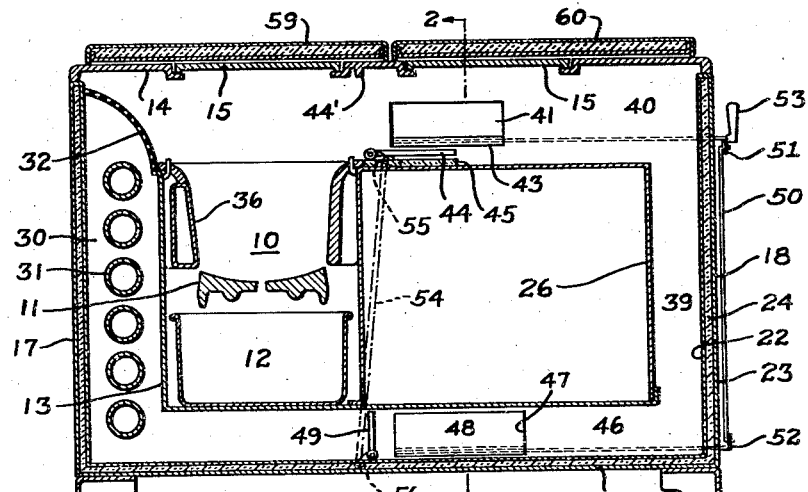
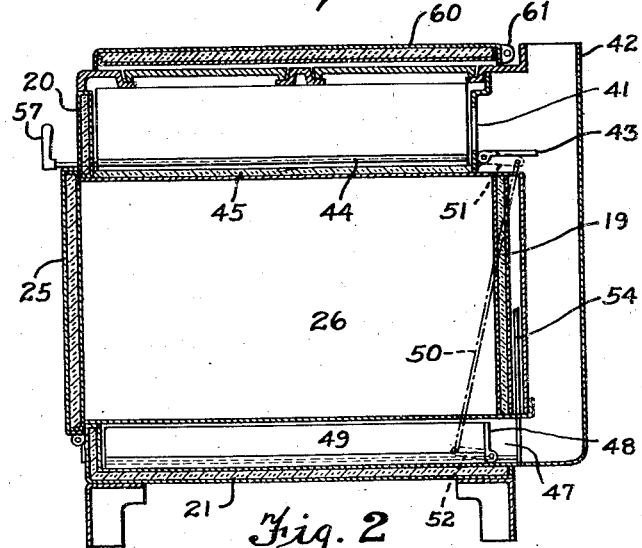
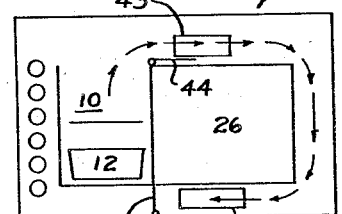
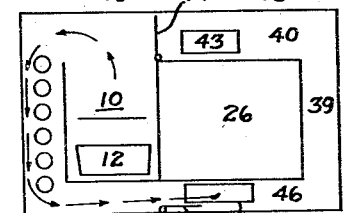
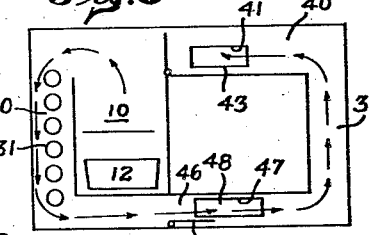
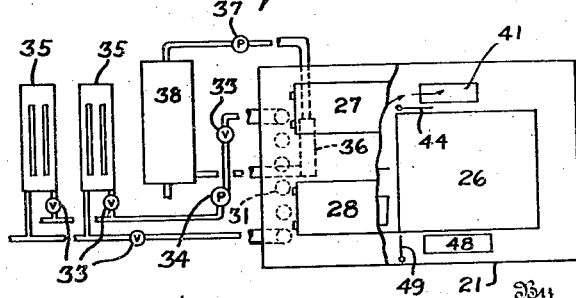
Inventor
Bertrand B. Kahn
By Maréchal & Noë
Attorney Patented Mar. 20, 1945

2,372,086

UNITED STATES PATENT OFFICE 2,372,086

STOVE

Bertrand B. Kahn, Cincinnati, Ohio, assignor to The Estate Stove Company, Hamilton, Ohio, a corporation of Ohio Application February 18, 1941, Serial No. 379,496

2 Claims. (Cl. 126—5)

This invention relates to stoves and more particularly to stoves adapted for both heating and cooking purposes.

One object of the invention is the provision of a stove having a cooking top and an oven for cooking purposes and also having a water conduit for heating water for washing or for house warming purposes, with provision for varying the path of flow of the combustion gases to control the heating effect given to the water conduit independently of the heat requirements for cooking and for independently controlling the heat supplied to the oven so that any desired heat balance and wide variation of heat distribution for cooking and for heating purposes may be obtained with a high degree of efficiency in operation.

Another object of the invention is the provision of a stove having a water conduit arranged adjacent the combustion chamber, with means providing a downflow of combustion gases past the water conduit and for discharge of those gases either before or after they are utilized to heat the oven, in accordance with the heat requirements for cooking purposes, control means being provided to block the flow of combustion gases past the water conduit and cause their discharge before they pass by the oven, or after passing and heating the oven, dependent upon the oven heat requirements.

Another object of the invention is the provision of a stove having a water heating means and an oven at sides of the combustion chamber, with upper and lower flue passages adjacent the oven and each having openings and dampers to give various paths of travel to the combustion gases in order that heat may be supplied to the water heating means and the oven each independently of the requirements of the other.

Other objects and advantages of the invention will be apparent from the following description, the appended claims and the accompanying drawing.

In the drawing,

Fig. 1 is a vertical longitudinal section of a stove embodying the present invention;

Fig. 2 is a transverse section on the line 2—2 of Fig. 1;

Fig. 3 is a front elevation of the stove diagrammatically showing its connection to a hot water supply tank and hot water radiators, with the dampers shown in position for heating the cooking top without substantially heating the oven or the water conduit of the water heating system;

Fig. 4 is a diagrammatic showing of the stove with the dampers adjusted to supply heat to the cooking top and the oven without substantially heating the water conduit.

Fig. 5 is a diagrammatic view of the stove showing the dampers arranged for heating the cooking top and the water conduit without substantially heating the oven; and Fig. 6 is a diagrammatic view of the stove showing the dampers positioned for heating the cooking top, the water conduit and the oven.

The drawing shows the preferred embodiment of the invention in the form of a coal stove having a single fire box or combustion chamber, and provided with an oven, a cooking top, and a water heating conduit or coil arranged in a chamber adjacent the fire box, the water conduit being adapted for connection to house warming hot water radiators, so that heat may be furnished for both cooking purposes and house warming purposes. There is also provision for heating water used for washing or culinary purposes. Referring more particularly to the drawing, in which the same reference numerals have been used to designate like parts in the several views, 10 generally designates the fire box or combustion chamber of the stove. As the stove shown is adapted to burn solid fuel, a grate 11 is arranged over the ashbox 12 which is carried by the lower wall of a sheet steel support 13 suitably carried by the walls of the stove. The support 13 extends up along opposite sides of the fire box and supports the latter in position.

The combustion chamber is arranged below a metal cooking top 14, which is preferably provided with removable lids 15, and which is supported by the upper ends of side walls arranged at the front, back and lateral sides of the stove. The lateral walls 17 and 18, back wall 19 and front wall 20 extend up from the bottom wall 21 which may be carried by suitable legs. The bottom wall 21 and the side walls are heavily insulated against heat loss, these walls being preferably made from inner and outer metal sheets 22 and 23 spaced apart and enclosing a layer of heat insulation 24. At the front of the stove is a heat insulated oven door 25 for the oven 26, and heat insulated fuel and ashpit doors 27 and 28 arranged laterally of the oven door.

Between the lateral wall 17 and the combustion chamber 10 is a water heating chamber 30 containing water heating means shown in the form of a pipe coil 31 of large heat absorption capacity, the coil having a spaced relation from the lateral wall 17 and from the outside of the combustion chamber so that combustion gases passing from the upper part of the combustion chamber, through the foraminous coal guard 32 which prevents coal from falling into the chamber 30, may pass down through the chamber 30 along opposite sides of the coil 31 and heat the water in the coil. With such an arrangement, if the downward flow of the combustion gases through the chamber 30 is prevented there will be only a comparatively small heat transmission from the combustion chamber to the pipe coil.

The pipe coil 31 is of such capacity as to adequately heat water used for house heating purposes, and is connected, as indicated in Fig. 3, to a booster circulating pump 34 and to house warming radiators 35. Suitable control valves 33 are provided so that the supply of hot water to the radiators can be readily controlled.

While the coil 31 could be used for the supply of hot water for washing and culinary purposes as well as for heating the radiators 35, it is preferred to provide an independent water back 36 for heating hot water for washing purposes. The water back 36, as shown in Figs. 1 and 3, is located in the fire box so as to form one of the walls thereof, and is connected independently of the house warming heating coil 31 to a booster pump 37 and a hot water supply tank 38 so that there will be no necessity, during the summer months, of heating the major coil 31. With an independent hot water supply for washing or culinary purposes the additional independent heating surface provided by the water back 36 has a further advantage of increasing the capacity of the system and also preventing the liming of the major heating coil 31, as only a comparatively small quantity of replacement water would be needed in the house warming water circuit which has a return passage from the radiators back to the coil 31.

The oven 26 is spaced from the lateral wall 18 of the stove, providing a vertical flue passage 39 at a side of the oven. The upper end of this passage communicates with a horizontally extending upper flue passage 40 which reaches over the oven below the cooking top and extends to the upper part of the combustion chamber. This flue passage 40 is provided with a discharge opening 41 which leads to the discharge pipe 42, a damper 43 being operable to open or close this opening 41. Extending from front to back of the stove between the upper part of the combustion chamber and the inner end portion of the passage 40 is a damper 44 which may be opened to the position shown in Fig. 1 where it overlies a sheet of insulation 45 attached to the top of the oven. When damper 44 is open the upper portion of the combustion chamber is placed in free communication with the flue passage 40, and the combustion gases may then promptly exit through the opening 41 if the damper 43 is open. When damper 44 is turned to a vertical position and rests against a flange 44' on the cooking top, it closes the combustion chamber from the inner end of the passage 40 and thus compels the combustion gases to flow downwardly through the water heating chamber 30.

Extending along the lower side of the oven, between the bottom wall of the oven and the bottom wall 21 of the stove is a lower horizontal flue passage 46, communicating at one end with the lower end of the flue passage 39 and communicating at its other end with the lower portion of the water heating chamber 30. This passage 46 is also provided with a discharge opening 47 having a damper 48 which closes this opening when positioned vertically as indicated in Figs. 2 and 3. The damper 48 may be moved under the control of the operator to open the passage 46 into free communication with the discharge pipe 42 for discharge of combustion gases from the stove. In the passage 46 is a damper 49 which is movable to a vertical or closed position as indicated in Figs. 1 and 2, to block communication between chamber 30 and the passage 46. When the damper 49 is open in the position shown in Figs. 5 and 6, communication is established between the lower portion of the chamber 30 and the passage 46.

The dampers 43 and 48 are preferably interconnected as by means of a connecting link 50 connected to short arms 51 and 52 that are fixed to the respective dampers, and a manually operable handle 53 is connected to the damper 43. Thus both of these dampers may be simultaneously moved to their limiting open or closed positions or to any intermediate position as desired, one closing as the other opens. The dampers 44 and 49 are also interconnected so that one opens as the other closes, the connection being shown as a link 54 pivotally connected to short arms 55 and 56 on the dampers 44 and 49 respectively, damper 44 being fixed to a handle 57 which may be arranged at an accessible location and which may be moved by the operator to adjust these dampers to open or closed positions and permitting their adjustment to intermediate positions.

The cooking top 14 is provided with a readily movable heat insulating cover, shown as cover sections 59 and 60 which may be readily moved up from the cooking top when the latter is to be used for cooking purposes, but which may be arranged flat on the cooking top to substantially cover it and thus prevent substantial heat radiation from the top of the stove. The sections 59 and 60 are preferably hinged at their rear edges, at 61, to the rear part of the cooking top structure.

When it is desired to obtain a minimum heat effect for water heating purposes, and the cooking top of the stove is to be used, the dampers are positioned as indicated in Figs. 1 and 2, and the heat insulating cover section 59 or both sections 59 and 60 are moved up from the cooking top. In this position of the dampers the damper 44, being open, permits the direct discharge of hot gases from the upper portion of the combustion chamber to the outlet opening 41. The cooking top will thus be heated without circulating the hot combustion gases around the oven since the opening 47 is closed by the damper 48, and the damper 49, being closed, prevents the downflow of combustion gases past the water heating coil 31. Thus, in summer time or when no heating effect from radiators 35 is desired, the damper 48 may remain closed and the radiators 35 may be shut off by closing the valves 33. However there will be an adequate heating of the water back 36 for the supply of hot water for washing or culinary purposes.

When the oven is to be used for cooking and it is not desired to give any considerable heating effect to the house heating system, the dampers may be positioned as indicated in Fig. 4, damper 44 being open and damper 49 closed, and damper 43 being closed and damper 48 open. The combustion gases will thus be blocked from passage past the main water coil 31 and will travel over the top of the oven down through the passage 39 and then along the bottom of the oven for discharge through the opening 47. The cooking top and the oven are therefore heated and the cooking top may be covered or uncovered by the insulating cover sections 59 and 60 dependent on the requirements of the cooking top. If some heating effect in excess of the minimum effect is also desired for the water coil 31 when the stove is used for baking, the valves 49 and 44 may be moved to some intermediate position to give a proper proportioning of the heating effect for both house heating and for cooking purposes, as desired.

When the maximum heating effect is desired for the water coil 31, the valve 44 is closed, as indicated in Figs. 5 and 6, so that all the combustion gases first travel downwardly past this coil. From the lower portion of chamber 30 the gases may move out past the opened damper 48, damper 43 being closed, if the oven is not to be used. If the oven is also to be used the combustion gases, after passing through the water heating chamber, travel around the oven and discharge through the opening 41 with damper 43 open and damper 48 closed as indicated in Fig. 6, and the heat retained in the gases after passing the water conduit is thus utilized to heat the oven. The dampers 43 and 48 may both be partially opened, damper 44 being closed, when it is desired to provide a maximum heating effect for the house heating system while the oven is to be only partially heated.

As will now be apparent, the stove may be used efficiently for cooking as well as for supplying heat in large quantities, through the water heating means, for an adequate supply of hot water for washing and for heating a number of rooms, and the flow of the combustion gases can be controlled to give any required oven temperature in accordance with the requirements for baking, and to give any desired water heating effect in accordance with the house warming requirements. By the proper manipulation of the dampers the combustion gases can be so directed that they will not have any substantial or large heating effect on the coil 31, there being an independent control of the heat required for cooking purposes and for water heating purposes so as to give any desired proper balance of heat distribution and the proper distribution of heat in accordance with whether or not the oven is to be used. Where heat is to be rapidly transmitted to the oven as well as to the water coil, all the hot combustion gases are conducted successively past the water coil and then around the walls of the oven before they are carried away from the stove. Since the dampers are adjustable to give any desired proportioning or heat distribution, the stove operates efficiently at all seasons of the year without removing or replacing any part of the water heating means of the stove, and without wasteful heat losses.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A stove comprising top, bottom and side walls forming an enclosure, a combustion chamber below said top wall, a water heating chamber between one of said walls and one side of the combustion chamber, an oven between another of said side walls and the opposite side of the combustion chamber, a top flue extending below said top wall and establishing communication through the space above said chambers and said oven, side passages adjacent said side walls and communicating with said top flue, one of said passages having said water heating chamber therein, a bottom flue below said oven and said combustion chamber communicating with the lower ends of said side passages, said top and bottom flues having openings for the discharge of combustion gases located at intermediate points therein adjacent the combustion chamber and substantially above and below said oven respectively, means for controlling the flow of combustion gases through said respective openings, dampers located adjacent the junctions of and between said combustion chamber and said oven in each of said top and bottom flues respectively for blocking the flow of combustion gases therethrough when said dampers are in closed position, said top flue damper being operable to closed position concurrently with the setting of said bottom flue damper in open position providing for the flow of combustion gases to heat said water heating chamber without heating said oven when said control means in said bottom flue is open and said control means in said top flue is closed, and said top flue damper being operable to open position concurrently with the setting of said bottom flue damper in closed position with said control means in said top flue being closed to cause passage of the combustion gases around said oven and out through the opening in said bottom flue to heat the oven without heating said water heating chamber.

2. A stove comprising top, bottom and side walls forming an enclosure, a combustion chamber below said top wall, a water heating chamber between one of said walls and one side of the combustion chamber, an oven between another of said side walls and the opposite side of the combustion chamber, a top flue extending below said top wall and establishing communication through the space above said chambers and said oven, side passages adjacent said side walls and communicating with said top flue, a bottom flue extending below the bottoms of the oven and of said chambers and communicating with the lower ends of said side passages, said top and bottom flues having openings for the discharge of combustion gases located at intermediate points therein adjacent the combustion chamber and substantially above and below said oven respectively, means for controlling the flow of combustion gases through said respective openings, dampers located adjacent the junctions of and between said combustion chamber and said oven in each of said top and bottom flues respectively for blocking the flow of combustion gases through said flues when said dampers are in closed position, said top flue damper being operable at closed position concurrently with the setting of said bottom flue damper in open position providing for the flow of combustion gases to heat said water heating chamber without heating said oven when said control means in said bottom flue is open and said control means in said top flue is closed, the flow of said combustion gases continuing around said oven and out the opening in said top flue to also heat the oven when said control means in said bottom flue is closed and that in said top flue is open, and said top flue damper being operable to open position concurrently with the setting of said bottom flue damper in closed position with said control means in said top flue being closed to cause passage of the combustion gases around said oven and out through the opening in said bottom flue to heat the oven without heating said water heating chamber.

BERTRAND B. KAHN.